April 16, 1963     V. F. WIGAL     3,085,630
ROTARY WING AIRCRAFT
Filed Nov. 17, 1959
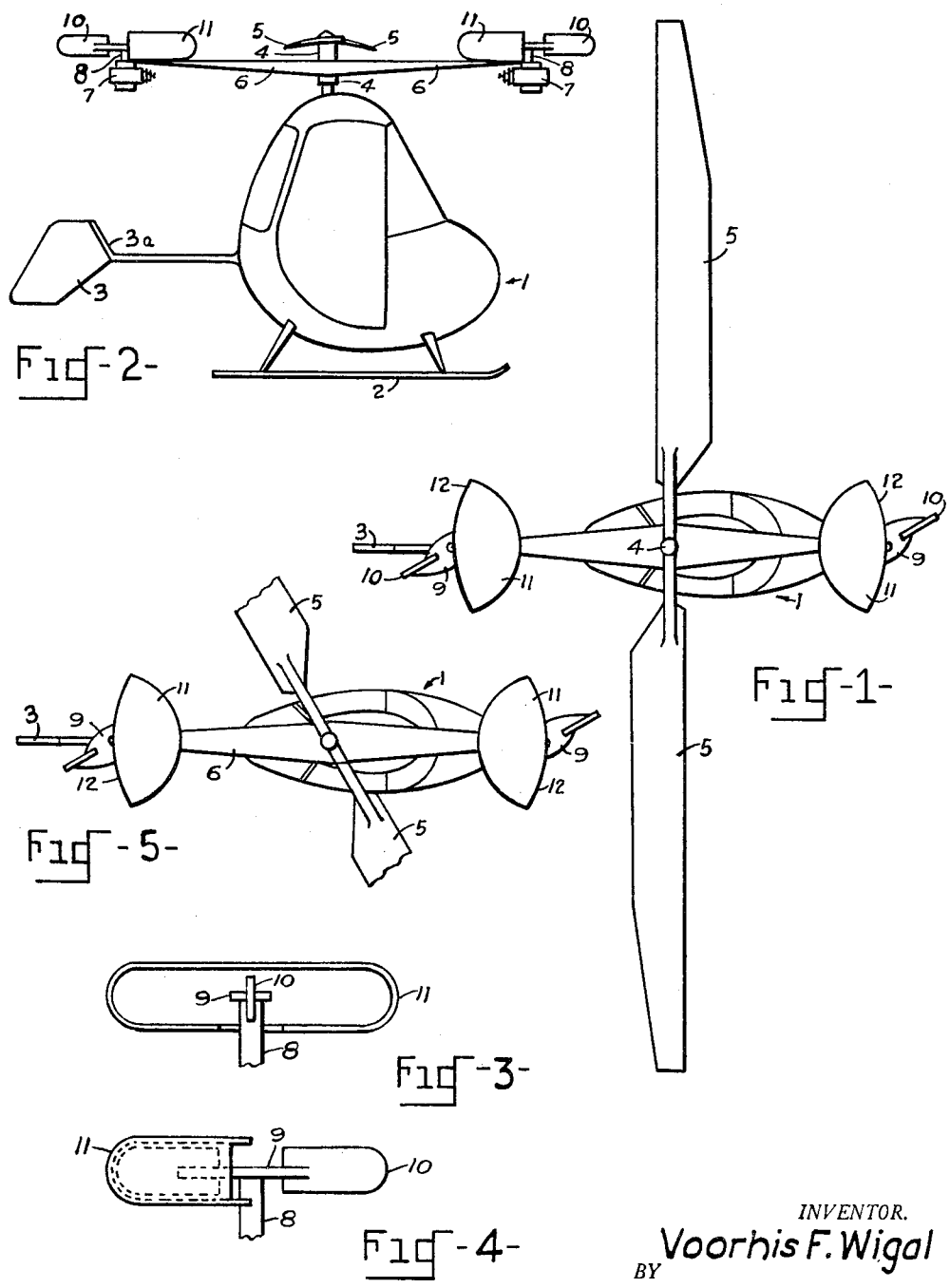
INVENTOR.
Voorhis F. Wigal
BY
*H. E. Thibodeau*
ATTORNEY United States Patent Office 3,085,630
Patented Apr. 16, 1963

3,085,630
ROTARY WING AIRCRAFT
Voorhis F. Wigal, 600 Mobile Ave., Jackson, Tenn.
Filed Nov. 17, 1959, Ser. No. 853,534
10 Claims. (Cl. 170—135.21)

This invention relates to vertical lift aircraft of the rotary wing type. In actual usage, these have heretofore comprised, in the main, an extensive fuselage, ponderous power plants in the body, and heavy and complex gearing, which add up to excessive weight and expense. In addition, these craft have involved a problem of correction for the torque involved in moving the rotary wing. By far the most common approach to the torque problem has been to mount an auxiliary, relatively small airscrew rotor on the tail of the fuselage for rotation about an axis perpendicular to both the axis of the lift rotor and the fore and aft line of the fuselage.

Various proposals have been made in which the aim was to eliminate the objectionable gearing and the need for torque correction. One of these involved jet reaction devices carried by the rotary wing, but a serious objection is that jet action is notoriously inefficient at low speeds. Another approach has been to mount small, outboard airscrews on the wing to drive it in rotation. Attempts along this line have variously suggested a small driving engine attached to and moving with each driving propellor, or a central power plant judiciously located with respect to the center of gravity of the craft and coupled to the propellors by appropriate gearing or cables. In the latter case the problem of torque correction reappears and must be separately dealt with. The auxiliary airscrew type of rotor pusher has left much to be desired in the way of efficiency and therefore has failed to come into any noticeable recognition or use.

I have found that in the use of outboard impellers for rotary wing aircraft, most of the difficulties inherent in the craft of the prior art are obviated by the use of impelling rotors, preferably flat-vaned, which are arranged to rotate on an axis parallel to that of the main, lifting wing. By this arrangement, in which the radially inner half of the sweep circle of the impeller is shrouded to directionalize the thrust, not only is more efficiency provided in the amount of force exerted transversely of the main rotor, but an appreciable amount of the output of the impeller is utilized in added lift by the main rotor.

It is therefore an object of the invention to provide a rotary wing aircraft in which the need for torque correction is obviated. A further object is to provide a man-carrying craft of this type which is small in size, weight and cost, coupled with relatively high efficiency. Specifically, it is an object to provide a rotary-wing craft of the outboard impeller type which proivdes improved efficiency of thrust over known types while otherwise providing improved aerodynamic conditions contributing to the lift function of the main lift rotor.

These and other ends are attained by the present invention, preferred forms of which are described in the specification below, as illustrated in the drawings, in which:

FIG. 1 is a top plan view of a rotary wing aircraft,
FIG. 2 is a side elevational view as seen from below FIG. 1,
FIG. 3 is an enlarged, fragmentary view in side elevation of one of the outboard impellers, as viewed from without the craft and radially inward,
FIG. 4 is a view similar to FIG. 3 taken from the left of and along a line 90° removed from that of FIG. 3, and
FIG. 5 is a view similar to FIG. 1, partly broken away, showing a different, fixed angular relation between the rotary wing and the arm carrying the impellers.

Referring to the drawings by characters of reference, there is shown generally at 1 a cabin with a landing frame 2 and a rudder 3, hinged along the slant element 3a. Since these elements form no part of the invention they are shown in general outline only, and any conventional controls may be provided for the rudder.

Freely journalled by any suitable means, and protruding above the cabin is a shaft 4 to which is fixedly attached a pair of rotary lift wings 5 of airfoil section and angle of attack, which may be variable by conventional means and for purposes well understood in the art.

Also fixedly attached to the shaft 4 and extending radially outward on opposite sides thereof is a cantilever arm 6, carrying at its outer ends a pair of motors 7 which for purposes of illustration are shown in general outline as single-cylinder internal combustion engines with output shafts 8 rotating on vertical axes, or, more significantly, on axes generally parallel to the axis of the main rotor shaft 4.

Fixed to each motor shaft 8 is an arm 9 carrying at its radially opposite ends a pair of blades 10, which in the embodiment shown lie in planes generally parallel to the shaft 4 of the main rotor.

Also attached to the motor-carrying arm 6 at radially opposite positions are two shrouds or hoods 11, each in the form of a segment of a flattened spheroid, which closely surround the blades 10 during that portion of their sweep within a circle based on the center of shaft 4 and passing through the center of shaft 8, as defined by the circular edges 12 forming the outer boundaries of shrouds 11.

With motors 7 in operation and provided with suitable controls, blades 10 are caused to turn. As a result of the inertia of the air mass in the path of the blades 10 and the differential pressure resulting on opposite sides of the blades, a reaction or torque force is applied at motor shafts 8 in the opposite sense to the direction of motion of blades 10 in their travel exteriorly of the shoud. One purpose of the shrouds is therefore to mask the blades during their travel inwardly of the shroud, so that the impulse of the blades in the outer position will not be cancelled or reduced. Obviously, the shrouds could be placed so as to cover the outer travel of the blades in which case the arm 6 would rotate in the opposite direction.

As the blades 10 revolve clockwise as seen from above, the arms 6 are carried in counterclockwise rotation by the reaction at motor shafts 8, and main lift wings 5, being fixed to common shaft 4 with arms 6 are likewise carried in counterclockwise rotation, and due to their airfoil shape and angle of attack a lift of the entire craft results. It will be understood that suitable controls as found in the prior art may be provided in connection with the main lift wing to achieve forward motion and other desirable manouvering.

The basic action of impeller blades 10 in rotating the lift system may be likened to spur gears rolling on an internally toothed ring gear, a system which provides greater efficiency than airscrews. However, it is a further, important aspect of the present invention that the combination of vertical blades and shroud provides an additional aero dynamic advantage in that the agitated air stream, particularly that ejected from the shroud interacts with lift wings 5 in the outer, highspeed portion of their sweep path to enhance the lift. Thus, the apparent loss in the masking by the shrouds 11 becomes an advantage.

The general performance of the impellers may be varied, as desired, by a choice of the fixed angle between arms 6 and wings 5, or, more particularly by bringing the impellers closer to one of wings 5 than the other, rather than the intermediate position. One example is shown in FIG. 5 where the angle between arm 6 and wing 5 is shown as less than 90°.

While the impellers have been shown at a certain distance from the shaft 4, this location may be varied within reasonable limits as the overall design and performance requirements may demand, and impellers which are adjustable in this respect are also contemplated. The particular size and shape and location of the shrouds are also susceptible of variation in the practice of the invention. Although localized outboard power plants have been shown, the impellers may be driven by a prime mover located centrally of the craft and connected by gearing or cables as well-known in the type of prior craft using airscrews for impellers. A certain amount of latitude is also possible in the orientation of impeller blades 10 which need not be strictly parallel to a plane through motor shaft 8, the prime consideration being their revolution about an axis normal to the sweep path of the lift rotors 5.

The aircraft described above with its novel construction and mode of operation comprises a system which is higher in efficiency than craft of this general type heretofore known, and constitutes a man-carrying machine which is low in cost, simple and light of construction, easy of maintenance, storage and manouvering, and which therefore fills a distinct, and long existent need of the general public. Whereas the fuselage has been shown as a man-carrying cabin, the lower structure, referred to hereinafter in the claims as a "main body," may well be little more than a seat plus a rudder, and sufficient body to journal the main rotary wing.

While certain preferred embodiments of the invention have been shown for purposes of illustration, the invention is not to be deemed as limited thereby, or by the specific possible modifications which have been enumerated above, but only insofar as limitation may be properly inferred from the spirit and scope of the appended claims in the light of this specification.

I claim:

1. An aircraft comprising a main body, a rotary wing idly journalled in said body, powered, rotary impeller means located radially outward of the axis of journalling of said wing and arranged for rotation on an axis generally parallel to said axis of journalling of said wing, and means connecting said impeller means to said wing whereby said impeller means, as a whole, revolves with said wing in fixed relation thereto.

2. An aircraft comprising a main body, a rotary wing idly journalled in said body, powered, rotary blade units located radially outward of the axis of journalling of said wing and arranged for rotation on an axis generally parallel to said axis of journalling of said wing, and means connecting said blade units to said wing whereby said blade units revolve with said wing in fixed relation thereto.

3. An aircraft comprising a main body, a rotary wing journalled in said body, powered, rotary blade units mounted radially outward of the axis of journalling of said wing on axes generally parallel to the axis of journalling of said wing, shroud means enclosing a portion of the rotary path of travel of said blade units, and means connecting said blade units to said wing whereby said blade units revolve with said wing in fixed relation thereto.

4. An aircraft comprising a main body, a rotary wing journalled in said main body, a powered rotary blade unit mounted radially outwardly of the axis of journalling of said wing on an axis generally parallel to the axis of journalling of said wing, means enclosing a portion of the sweep path of said blade unit in a region covering a radial line from the axis of journalling of said wing, and means connecting said blade unit to said wing whereby said blade unit revolves with said wing in fixed relation thereto.

5. An aircraft comprising a main body, a rotary wing journalled in said main body on a main axis, a powered rotary blade unit mounted radially outwardly of the said main axis on an axis generally parallel thereto, means enclosing a portion of the sweep path of said blade unit between the axis of said unit and said main axis, and means connecting said blade unit to said wing whereby said blade unit revolves with said wing in fixed relation thereto.

6. An aircraft comprising a main body, a rotary wing journalled in said body on a main axis, a rotary blade unit, means fixedly connected to said main wing for revolution therewith and journalling said blade unit radially outward of said main axis on an axis generally parallel to said main axis, and means carried by said first-mentioned means and enclosing a portion of the sweep path of said blade unit in a region including a portion of a sector defined by radial lines from said main axis.

7. An aircraft comprising a main body, a rotary wing journalled in said body on a main axis, an arm extending radially from said main axis and having a fixed connection with said wing for revolution therewith, a rotary blade unit journalled on said arm at a point radially outward of said main axis for rotation about an axis generally parallel to said main axis, shroud means carried by said arm and enclosing a portion of the sweep path of said blade unit in a region including a portion of a sector defined by radial lines from said main axis, and power means for said blade unit.

8. An aircraft comprising a main body, a rotary wing journalled in said body on a main axis, an arm extending radially from said main axis and having a fixed connection with said wing for revolution therewith, a rotary blade unit journalled on said arm at a point radially outwardly of said main axis for rotation about an axis generally parallel to said main axis, power means for said blade unit carried by said arm, and shroud means carried by said arm and enclosing a portion of the sweep path of said blade unit in a region including a portion of a sector defined by radial lines from said main axis.

9. An aircraft comprising a main body, a rotary wing journalled in said body on a main axis, an arm extending radially from said main axis and having a fixed connection with said wing, in angular relation thereto, an impeller unit carried by said arm, journalled for rotation about an axis generally parallel to said main axis and having blades generally parallel to said main axis, power means for said impeller unit carried by said arm, and shroud means carried by said arm and enclosing a portion of the sweep path of said blades in a region including a portion of a sector defined by radial lines from said main axis.

10. An aircraft comprising a main body, a rotary wing journalled in said body on a main axis, an arm extending radially from said main axis, oriented generally at right angles to said wing and having a fixed connection with said wing for revolution therewith, an impeller unit carried by said arm, journalled for rotation about an axis generally parallel to said main axis and having blades generally parallel to said main axis, power means for said impeller unit carried by said arm, and shroud means carried by said arm and enclosing a portion of the sweep path of said blades in a region including a portion of a sector defined by radial lines from said main axis.

References Cited in the file of this patent

UNITED STATES PATENTS

| | | |
|---|---|---|
| 1,237,340 | Hutchinson | Aug. 21, 1917 |
| 1,372,834 | Schmelzer | Mar. 29, 1921 |
| 2,165,757 | McLaughlin | July 11, 1939 |
| 2,183,186 | Dall'Asta | Dec. 12, 1939 |
| 2,771,255 | Young | Nov. 20, 1956 |

FOREIGN PATENTS

| | | |
|---|---|---|
| 774,607 | France | Dec. 10, 1934 |